UNITED STATES PATENT OFFICE.

EDWARD J. DE SMEDT, OF WASHINGTON, DISTRICT OF COLUMBIA.

MANUFACTURE OF PORTLAND CEMENT.

SPECIFICATION forming part of Letters Patent No. 274,735, dated March 27, 1883.

Application filed March 1, 1883. (No specimens.)

*To all whom it may concern:*

Be it known that I, EDWARD J. DE SMEDT, of the city of Washington, District of Columbia, have invented a new and useful Improvement in the Manufacture of Portland Cement, of which the following is a specification.

Argillo-magnesian and argillo-calcareous cement-rocks and hydraulic limestones are found quite abundantly both in this country and in Europe, and have been used extensively for the manufacture of cement; but although containing silica, alumina, magnesia, and lime and other ingredients they are ineffective in themselves to produce Portland cement, the cement made from them being common cement — such, for instance, as the cements known in the market as "Cumberland cement," "Rosendale cement," &c. It has been my object to devise some way of utilizing these rocks for the manufacture of Portland cement; and I have found that this result can be attained by combining with them "dolomite," by which term I intend and mean argillo-magnesian limestones containing at least fifteen per cent. of carbonate of magnesia, in sufficient quantity to bring the percentage of lime and magnesia in the compound up to about seventy per cent.

One way in which I carry my invention into practical effect is as follows: I take the cement-rocks or the hydraulic limestones, or both, and grind them up raw. I ascertain by analysis the chemical composition of the ground mass, with a view to determine the extent to which it is deficient in lime or lime and magnesia. I then add to the mass dolomite in such proportion as to make the manufactured Portland cement analyze about seventy per cent. (or, say, from fifty-five or sixty to seventy per cent.) of lime and magnesia. After the addition and incorporation of the dolomite the powdered or ground mass is moistened, made into bricks or other forms, dried, calcined to a clinker, and ground into cement under either the "wet" process or the "dry" process, as preferred; or, if desired, it may be made into cement in accordance with the process described in my Letters Patent bearing date of March 20, 1883, the characteristic of said patented process residing in the mixture with the cement-paste, before calcination, of a hydrocarbon or other combustible.

I can also make, and have also made, Portland cement from ordinary natural cement— such as Rosendale cement and Cumberland cement—by adding to them dolomite in the proportion hereinbefore indicated, and then moistening the mass, making it into bricks or other forms, recalcining the same to clinker, and then grinding the calcined product.

I have also made Portland cement from these ordinary natural cements by first recalcining the latter to clinker, and then regrinding and adding calcined and ground dolomite in the proportion hereinbefore indicated. The Portland cement thus obtained is, however, more slow-setting than that obtained by adding dolomite to the mass before calcination.

I desire it to be understood that I intend to include within the terms of my claim all of the foregoing-recited methods of applying and using cement-rocks or hydraulic limestones, whether raw or in the conditions of cements, for the purpose of producing a Portland cement.

Having now described my invention and the best way known to me of carrying the same into practical effect, I state my claims as follows:

1. The improvement in the art of manufacturing Portland cement, consisting in combining with cement-rocks or hydraulic limestones, either before or after the calcining operation, dolomite in substantially the proportions stated.

2. The process of manufacturing Portland cement, consisting in combining with ground or pulverized cement-rocks or hydraulic limestones dolomite, in substantially the proportions stated, and subsequently calcining and grinding said compound, substantially as hereinbefore set forth.

3. The hereinbefore-described product obtained from the combination, substantially in the manner set forth, of cement-rocks or hydraulic limestones with dolomite, in substantially the proportions stated.

In testimony whereof I have hereunto set my hand.

E. J. DE SMEDT.

Witnesses:
J. WALTER BLANDFORD
H. B. ZEVELY.